J. L. GOSS.
STEERING GEAR.
APPLICATION FILED DEC. 2, 1916.

1,232,281.

Patented July 3, 1917.

WITNESSES

INVENTOR
J. L. Goss,
BY Victor J. Evans
ATTORNEY

UNITED STATES PATENT OFFICE.

JOHN L. GOSS, OF DAYTON, OHIO.

STEERING-GEAR.

1,232,281.　　　　Specification of Letters Patent.　　Patented July 3, 1917.

Application filed December 2, 1916. Serial No. 134,632.

*To all whom it may concern:*

Be it known that I, JOHN L. GOSS, a citizen of the United States, residing at Dayton, in the county of Montgomery and State of Ohio, have invented new and useful Improvements in Steering-Gears, of which the following is a specification.

This invention relates to steering gear for motor vehicles the object in view being to provide steering gear capable of being applied to machines already in use as well as to machines during the manufacture thereof, the improved steering gear rendering the vehicle comparatively easier to steer, being productive of a steadier steering action, avoiding the wabbling movements of the steering wheels now so glaringly noticeable in certain types of motor vehicles, and also rendering the machine much safer in traveling over loose road surfaces such as gravel, sand, mud, snow, ice and the like.

With the above and other objects in view, the invention consists in the novel construction, combination and arrangement of parts, herein described, illustrated and claimed.

In the accompanying drawing:—

Figure 1:
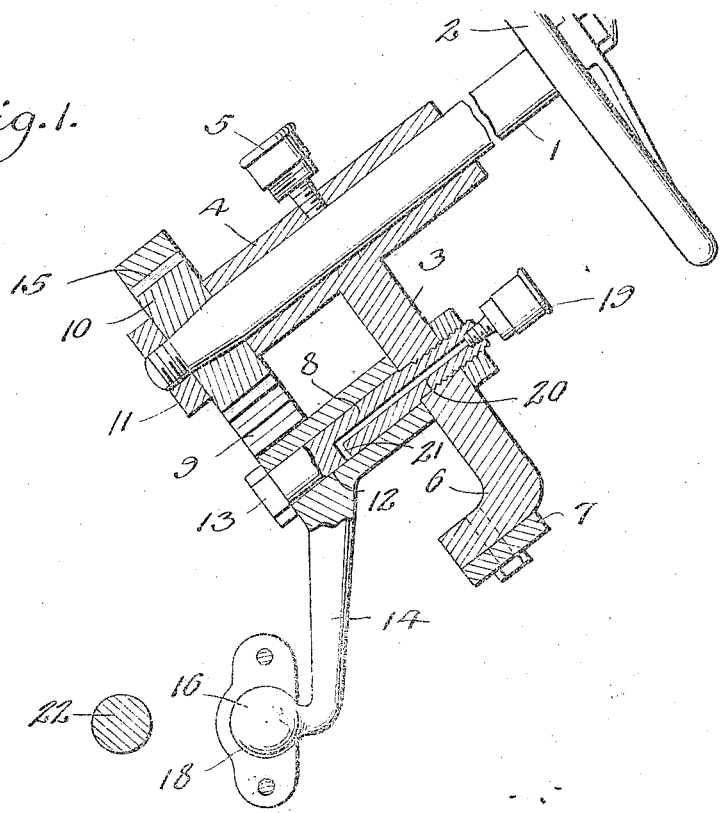
Figure 1 is a side elevation partly in section showing the relation of the improved steering gear to the steering shaft of a motor vehicle.

Referring to the drawings 1 designates the steering shaft of a motor vehicle provided as usual at the upper extremity thereof with the hand wheel 2.

In carrying out this invention, I provide a supporting bracket 3 having a sleeve like portion 4 through which the shaft 1 extends and in which it is adapted to turn, the cylindrical or sleeve like portion 4 being provided with a grease cup 5 so that grease may be injected into the bearing portion 4 of the bracket 3.

The bracket 3 comprises an arm 6 the end portion of which is curved or deflected to enable a brace 7 to be fastened thereto, said brace extending laterally from the arm 6 and being connected to a fixed part of the engine or engine base as shown. Extending laterally from the arm 6 is a fulcrum post 8 upon which is journaled an internally toothed sector gear 9 which meshes with a pinion 10 fast on the steering shaft 1 and secured in place thereon by fastening means 11, the latter being shown in the form of a nut threaded on the shaft 1.

Figure 2:
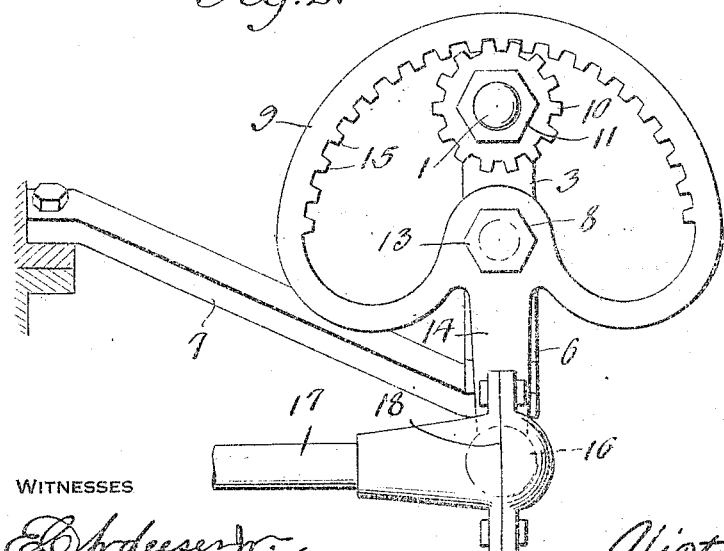
Fig. 2 is a front elevation of the same.

The gear 9 is heart shaped as shown in Fig. 2 and formed with a bearing opening 12 to fit the post 8, said post being provided with a head or shoulder 13 to hold the sector gear in place. The sector gear is provided with an arm 14 arranged at the opposite side of the fulcrum post 8 from the internal teeth 15 of the sector gear, said arm terminating in a ball 16 to which is attached the usual steering gear connecting rod 17 formed with a socket 18 to receive the ball 16.

The fulcrum post 8 extends through an opening in the arm 6 of the bracket in which it is threaded as shown and associated with the threaded extremity of the post 8 is a grease cup 19 which communicates with a feed channel 20 which extends longitudinally of the post 8 and has its terminal or discharge end deflected as shown at 21 so as to conduct the grease or other lubricant to the external surface of the post 8 so as to lubricate the bearing opening, 12 of the internal sector gear. The arm 14 with its ball 16 is so arranged that the ball 16 lies above the usual spindle connecting rod 22 thus providing for the up and down motion of the body and frame of the vehicle without causing the steering wheels to wabble or oscillate and cause an uncertain or unsteady movement of the vehicle. By overcoming this tendency of the steering wheels to wabble, the steering of the vehicle is rendered much steadier, better control is obtained by the operator of the machine and this is especially noticeable when traveling over loose road surfaces. The device as a whole may be applied to several well known and popular types of motor vehicles now in common use and has the merit of being capable of being attached to such machines now in use and after leaving the factory, without any alteration whatever in the vehicle itself and without requiring the services of a skilled mechanic.

Having thus described my invention, I claim:

1. The combination with the steering shaft of a motor vehicle, of a pinion fast thereon, an internally toothed sector gear meshing with said pinion and actuated thereby, a bracket embodying a bearing portion for the steering shaft, a fulcrum post extending from said bracket and having said sector gear journaled thereon, and an arm extending from said sector gear and adapted to have the steering gear connecting rod attached thereto.

2. The combination with the steering shaft of a motor vehicle, of a pinion fast thereon, an internally toothed sector gear meshing with said pinion and actuated thereby, a bracket embodying a bearing portion for the steering shaft, a fulcrum post extending from said bracket and having said sector gear journaled thereon, an arm extending from said sector gear and adapted to have the steering gear connecting rod attached thereto, said fulcrum post extending through the bracket and formed with a passage for conducting lubricant to the fulcrum point of said sector gear, and a lubricant cup attached to one end of said fulcrum post.

3. The combination with the steering shaft of a motor vehicle, of a pinion fast thereon, an internally toothed sector gear meshing with said pinion and actuated thereby, a bracket embodying a bearing portion for the steering shaft, a fulcrum post extending from said bracket and having said sector gear journaled thereon, an arm extending from said sector gear and adapted to have the steering gear connecting rod attached thereto, and a brace extending from the bracket to a point having a fixed relation to the vehicle frame.

In testimony whereof I affix my signature.

JOHN L. GOSS.